US011128082B1

(12) United States Patent
Wise et al.

(10) Patent No.: US 11,128,082 B1
(45) Date of Patent: Sep. 21, 2021

(54) ANDROGYNOUS CONNECTION DEVICE

(71) Applicant: Blink Astro, LLC, Atlanta, GA (US)

(72) Inventors: Evan Shelby Wise, Atlanta, GA (US); John Terrell Madigan, Atlanta, GA (US); William Carlton Doncaster, Atlanta, GA (US); Kevin Marcus Feld, Atlanta, GA (US); Jon Grant Wallace, Atlanta, GA (US); Matthew David Arceri, Atlanta, GA (US); Wahaj Umar Khan, Atlanta, GA (US)

(73) Assignee: Blink Astro, LLC, Atlanta, GA (US)

( * ) Notice: Subject to any disclaimer, the term of this patent is extended or adjusted under 35 U.S.C. 154(b) by 7 days.

(21) Appl. No.: 16/586,232

(22) Filed: Sep. 27, 2019

Related U.S. Application Data

(60) Provisional application No. 62/737,386, filed on Sep. 27, 2018.

(51) Int. Cl.
| | |
|---|---|
| *H01R 13/62* | (2006.01) |
| *H01R 13/514* | (2006.01) |
| *B64G 1/64* | (2006.01) |
| *H01R 12/70* | (2011.01) |
| *H01R 13/627* | (2006.01) |

(52) U.S. Cl.
CPC ............ *H01R 13/514* (2013.01); *B64G 1/64* (2013.01); *H01R 12/70* (2013.01); *H01R 13/6273* (2013.01)

(58) Field of Classification Search
CPC .............. H01R 23/684; H01R 23/7026; H01R 13/193; H01R 23/722
USPC ...................... 439/331, 330, 342, 70, 71, 73
See application file for complete search history.

(56) References Cited

U.S. PATENT DOCUMENTS

| | | | | |
|---|---|---|---|---|
| 4,626,053 A | * | 12/1986 | Fayfield | ................. H01R 29/00 |
| | | | | 439/222 |
| 6,368,137 B1 | * | 4/2002 | Orwoll | ................. G01R 1/0483 |
| | | | | 439/331 |

* cited by examiner

*Primary Examiner* — Phuong Chi Thi Nguyen
(74) *Attorney, Agent, or Firm* — Morris, Manning & Martin, LLP; Daniel E. Sineway, Esq.; Adam J. Thompson, Esq.

(57) ABSTRACT

Androgynous modular connectors (e.g., modular spacecraft connectors) are disclosed herein. The modular connectors can include prismatic-shaped body with side panels, a base, and a face panel. The face panel can include three or more sides that define an opening. A claw assembly can be housed within the prismatic-shaped body. The claw assembly can include two or more extendable arms. A motor can be housed within the prismatic-shaped body. The motor can be operatively connected to the claw assembly. The motor can be configured to extend and retract the claw assembly.

23 Claims, 6 Drawing Sheets

ANDROGYNOUS CONNECTION DEVICE

CROSS REFERENCE TO RELATED APPLICATIONS

This application claims the benefit of and priority to U.S. Provisional Patent Application No. 62/737,386, filed Sep. 27, 2018, and entitled "ANDROGYNOUS SPACECRAFT CONNECTION DEVICE," which is incorporated herein by reference in its entirety.

GOVERNMENT SUPPORT CLAUSE

This invention was made with government support under Phase II of the Small Business Innovation Research (SBIR) Program, D17PC00294, awarded by the Defense Advanced Research Projects Agency (DARPA). The government has certain rights in the invention.

TECHNICAL FIELD

The present systems, methods, and apparatuses relate generally to docking and connection devices, and more practically to spacecraft docking and connection devices.

BACKGROUND

As satellite technology becomes more commercialized, the need for a modular building system with interchangeable components and systems becomes more prevalent. Companies and governments across the globe continue to invest heavily in satellite technology as increased benefits (e.g., speed, reliability, coverage area, cost effectiveness, etc.) continue to realize, particularly as those benefits relate to a variety of technology.

Currently, however, modular devices, such as spacecraft modules, built by different companies or nations generally do not connect, support, or communicate with each other. This lack of interconnectivity severely hampers the development of the satellite industry, as open collaboration and communication have generally been known to fuel productivity and accelerate growth. Similarly, other robotic and electrical devices may lack the ability to form connection with one another. Therefore, there is a long-felt but unresolved need for systems and methods that facilitate a standard communication and connection mechanism capable of providing a common interface for all devices in a modular platform.

BRIEF SUMMARY OF THE DISCLOSURE

Briefly described, and according to one embodiment, aspects of the present disclosure generally relate to systems, methods, and apparatuses for docking and connection of modular devices where the modular connectors are self-aligning and androgynous. In various embodiments, the disclosed system (including a "modular connector") provides a mechanism that allows for automated connection and docking between two modular devices. The modular devices can correspond to spacecraft or satellites or portions thereof. In one embodiment, the present technology enables a modular building system that accelerates the utilization and commercialization of modular systems, including but not limited to, spacecraft, robotic devices, low earth orbit satellites and geostationary (or geosynchronous) satellites of various shapes and sizes. In these embodiments, a modular connector can establish a load-bearing mechanical connection that integrates with the modular devices, and supports electrical power transfer and data transfer (among other interfaces) between two or more modular devices, such as spacecraft. A modular connector, in one or more embodiments, provides a design that is androgynous and self-aligning, has a low form factor, requires little to no momentum transfer during docking, and also provides minimal force/momentum on resulting spacecraft being docked. Additionally, a modular connector allows for multiple docking orientations, and can provide a mechanism for pre-dock wireless data exchange.

In particular embodiments, modular connectors are compact in both size (approximately 10×10×10 cm) and weight (approximately less than 1,000 g); in other embodiments, the size of the modular connectors is 15-30 cm×15-30 cm×15-30 cm and the weight of the modular connectors is between 1000-5000 g, but can be any size. In one or more embodiments, a modular connector may include a variety of components, including but not limited to a face panel and four side panels that function as a casing for the modular connector. The modular connector can include a claw assembly to facilitate a physical connection to an adjacent modular connector and a swivel arm assembly to facilitate motion of the claw assembly. The modular connector can include a gear mount, planetary gear assembly, motor, and transfer disc to facilitate motion of the swivel arm assembly and claw assembly. The modular connector can include a track to provide stability for the multitude of components. The modular connector can include interfaces including a main electronics circuit board to provide power and facilitate control of the modular connector and multiple interface boards that can be mounted to the face panel to provide a power/data interface between two modular connectors. The interfaces can include one or more fluid interfaces to facilitate transfer of fluids between the modular connectors and modular devices. The fluids can include liquids and/or gases. The interfaces can include a mechanical transfer interface. The mechanical transfer interface can correspond to a rotating mechanism to transfer mechanical energy, such as via a motor, between the modular connectors and modular devices. The interfaces can include distance/range sensors and power regulation circuitry. In various embodiments, the interface boards may include pogo pins, or any other suitable electrical connectors, to facilitate the connection of both male and female components. The pins can be spring-loaded pins that provide electrical connectivity during movement of the pins.

In various embodiments, two or more modular connectors may communicate with each other and exchange data wirelessly prior to establishing a physical connection. In one embodiment, the two or more modular connectors may communicate with each other via radio frequency. In another embodiment, the two or more modular connectors may communicate with each other via optical communications. In particular embodiments, to facilitate docking, two or more modular connectors may exchange attitude information with each other prior to establishing a physical connection.

In one or more embodiments, a modular connector may mate, or pair with another modular connector. In these embodiments, due to the androgynous nature of the modular connectors, prior to connecting, the pairing modular connectors determine which device will function as a male and which device will serve as the female. This on-the-fly determination of gender roles, in combination with the modular connector's small size, multiple docking orientations, and soft and hard capture capability (as will be discussed herein), establish a notable improvement over previous technology, which was more limited and less efficient.

Alternative embodiments of modular connectors may include features that are, in some respects, similar to the various components described above. For example, such alternative embodiments may include, but are not limited to: larger dimensions, different connection claws, various data and power mechanisms, and other like variations.

According to particular embodiments, the present disclosure generally describes a modular connector including: a prismatic-shaped body including side panels, a base, and a face panel, wherein the base includes a bottom surface of the prismatic-shaped body, the side panels include sides of the prismatic-shaped body, and the face panel includes a top surface of the prismatic-shaped body, wherein the face panel further includes three or more sides that define an opening in the face panel; a claw assembly housed substantially within the prismatic-shaped body, the claw assembly including two or more extendable arms; a motor operatively connected to the claw assembly, the motor is configured to extend and retract the claw assembly.

In particular embodiments, the present disclosure describes the modular connector herein, further including a main electronics board for operational control of the modular connector. In one or more embodiments, aspects of the present disclosure generally describe the modular connector herein, wherein the claw assembly is configured to dock to a second modular connector in a plurality of orientations. In some embodiments, the present disclosure describes the modular connector herein, further including one or more electronic interface boards for transferring and receiving data, the one or more electronic interface boards including proximity sensors. Generally, in at least one embodiment, the present disclosure describes the modular connector herein, further including one or more interfaces including at least one of: a load-bearing mechanical interface, a power transfer interface, a fluid transfer interface, a mechanical transfer interface, and a two-way data transfer interface. In particular embodiments, the present disclosure describes the modular connector herein, wherein the modular connector weighs no more than 900 g, the length of the modular connector does not exceed 10 cm, the width of the modular connector does not exceed 10 cm, and the height of the modular connector does not exceed 10 cm. In various embodiments, the present disclosure describes the modular connector herein, further including a multi-axis inertial measurement unit in communication with a digital controller, the digital controller configured to determine an orientation of the modular connector based on at least one measurement from the inertial measurement unit. In one or more embodiments, the present disclosure describes the modular connector herein, wherein the modular connector is designed to operate in one of: geostationary planetary orbit and low planetary orbit.

According to various embodiments, the present disclosure generally describes a system for connecting two or more modular devices including: a first modular connector; and a second modular connector, wherein each of the first and second modular connectors include: a prismatic-shaped body including side panels, a base and a face panel, the base being coupled to a respective one of the two or more modular devices; one or more interfaces configured to transmit and receive data; a claw assembly housed substantially within the prismatic-shaped body, the claw assembly including two or more extendable arms; a motor operatively connected to the claw assembly, the motor for extending and retracting the claw assembly; wherein the claw assembly of the first modular connector is configured to: extend, enter, and latch onto the prismatic-shaped body of the second modular connector via openings in the face panels; and upon latching onto the prismatic-shaped body of the second modular connector, retract until the one or more interfaces of the first modular connector is operatively connected to the one or more interfaces of the second modular connector.

In particular embodiments, the present disclosure describes the system herein, wherein the base includes a bottom surface of the prismatic-shaped body, the side panels include sides of the prismatic-shaped body, and the face panel includes a top surface of the prismatic-shaped body and three or more sides that define the opening in the face panel, and wherein the face panel further includes the one or more interfaces. In certain embodiments, the present disclosure describes the system herein, wherein the claw assembly of the second modular connector extends, enters and latches onto the prismatic-shaped body of the first modular connector via the openings in the face panels. In at least one embodiment, the present disclosure describes the system herein, wherein the one or more interfaces of the first modular connector and the one or more interfaces of the second modular connector include the androgynous connectors of the same type. In some embodiments, the present disclosure describes the system herein, wherein the one or more interfaces includes redundancy via bypass and pass-through connections for power and data. Aspects of the present disclosure generally describe the system herein, wherein the two or more extendable arms each include a respective prism-shaped beak. In at least one embodiment, the present disclosure describes the system herein, wherein the first and second modular connectors exchange data via at least one of: radio frequency communication, optical communication, infrared transceivers, and laser communication. In various embodiments, the present disclosure describes the system herein, wherein the first modular connector aligns in one of a plurality of docking orientations with the second modular connector prior to the first modular connector's claw assembly extending, entering and latching onto the prismatic-shaped body of the second modular connector. In one or more embodiments, the present disclosure describes the system herein, wherein the first modular connector further includes proximity sensors to align itself with the second modular connector. In particular embodiments, the present disclosure describes the system herein, wherein the claw assembly is further configured to: latch onto the prismatic-shaped body of the second modular connector by moving a respective tip of each of the extendable arms of the claw assembly of the first modular connector to contact a respective corner grip of the prismatic-shaped body of the second modular connector; and retract until the one or more interfaces of the first modular connector is operatively connected to the one or more interfaces of the second modular connector by applying, via the extendable arms, a pulling force on the corner grip of the prismatic-shaped body of the second modular connector.

According to particular embodiments, the present disclosure generally describes a method for connecting two or more modular devices including: extending, via a motor of a first modular connector, a claw assembly of the first modular connector through an opening in a prismatic-shaped body of a second modular connector, the claw assembly including two or more extendable arms; latching the claw assembly onto the prismatic-shaped body of the second modular connector via openings in face panels of the first modular connector and second modular connector; upon latching onto the prismatic-shaped body of the second modular connector, retracting the claw assembly until one or more interfaces of the first modular connector couples to one or more interfaces of the second modular connector.

In particular embodiments, the present disclosure describes the method herein, further including: prior to establishing an electrical connection via the one or more interfaces, exchanging, via a wireless connection, data between the first modular connector and the second modular connector. In various embodiments, the present disclosure describes the method herein, further including: performing, via the first modular connector and the second modular connector, an automated rendezvous routine to cause the first modular connector and the second modular connector to be proximate to one another. In some embodiments, the present disclosure describes the method herein, further including: extending, via the motor housed of the first modular connector, the claw assembly of the first modular connector to disengage from the second modular connector; and retracting the claw assembly from the prismatic-shaped body of the second modular connector. In one or more embodiments, the present disclosure describes the method herein, further including: subsequent to retracting the claw assembly from the prismatic-shaped body of the second modular connector, extending the claw assembly of the first modular connector through an opening in a prismatic-shaped body of a third modular connector; latching the claw assembly onto the prismatic-shaped body of the third modular connector via openings in the face panel of the first modular connector and a face panel of the third modular connector; upon latching onto the prismatic-shaped body of the third modular connector, retracting the claw assembly until the one or more interfaces of the first modular connector couples to one or more interfaces of the third modular connector.

These and other aspects, features, and benefits of the claimed system will become apparent from the following detailed written description of the preferred embodiments and aspects taken in conjunction with the following drawings, although variations and modifications thereto may be effected without departing from the spirit and scope of the concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
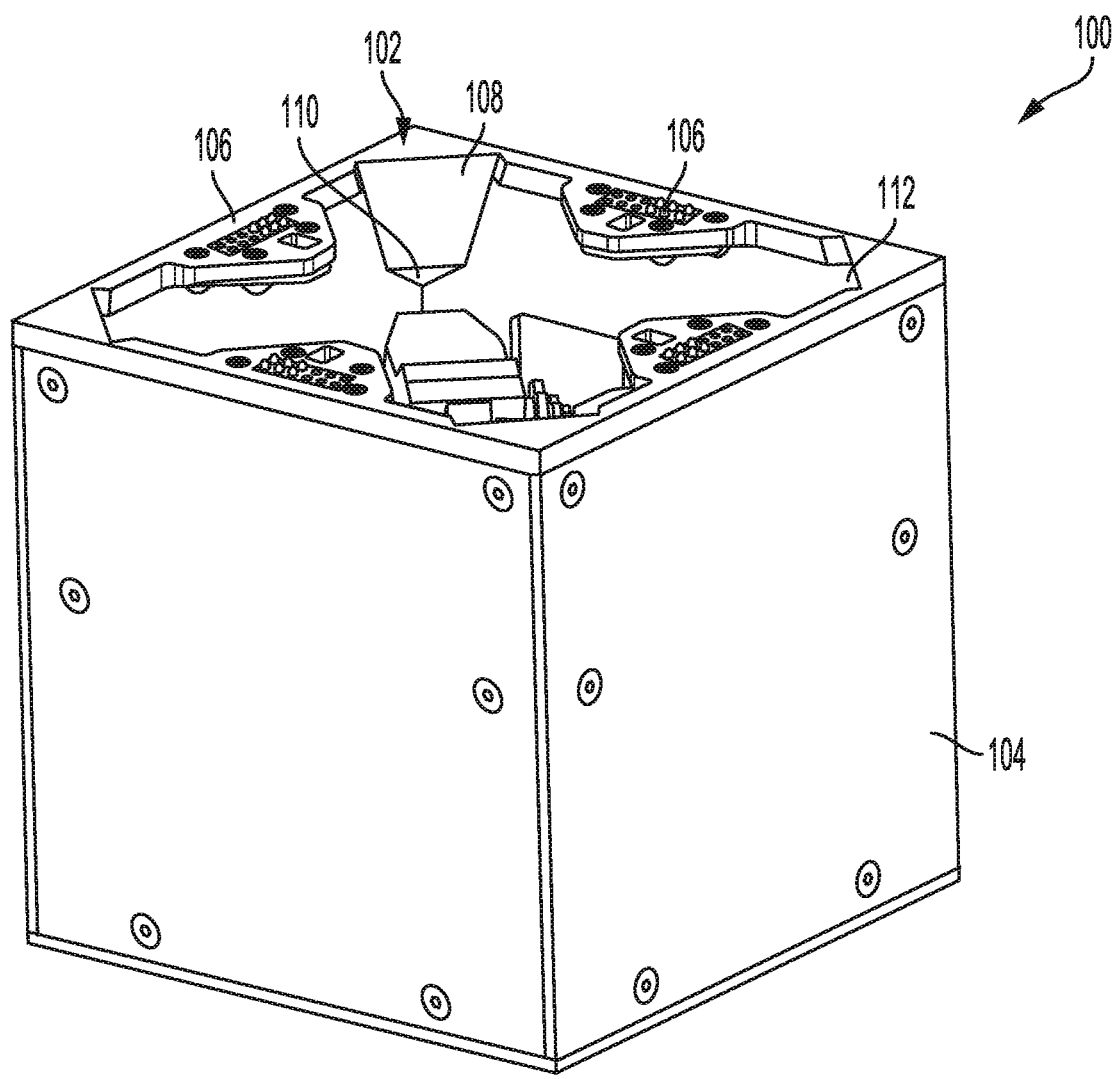
FIG. 1A illustrates an exemplary modular connector according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

The above and further features of the disclosed exemplary modular connectors will be recognized from the following detailed descriptions and drawings of particular embodiments.

Overview

According to various aspects of the present disclosure, aspects of the present disclosure generally relate to systems, methods, and apparatuses for docking and connection of modular devices where the modular connectors are self-aligning and androgynous. In various embodiments, the disclosed system (including a "modular connector") provides a mechanism that allows for automated connection and docking between two modular devices. The modular devices can correspond to spacecraft or satellites. In one embodiment, the present technology enables a modular building system that accelerates the utilization and commercialization of modular systems, including but not limited to, spacecraft, robotic devices, low earth orbit satellites and geostationary (or geosynchronous) satellites of various shapes and sizes. In these embodiments, a modular connector can establish a load-bearing mechanical connection that integrates with the modular devices, and supports electrical power transfer and data transfer (among other interfaces) between two or more modular devices, such as spacecraft. A modular connector, in one or more embodiments, provides a design that is androgynous and self-aligning, has a low form factor, requires little to no momentum transfer during docking, and also provides minimal force/momentum on resulting spacecraft being docked. Additionally, a modular connector can allow for multiple docking orientations and provide a mechanism for pre-dock wireless data exchange.

In particular embodiments, modular connectors are compact in both size (approximately 10×10×10 cm) and weight (approximately less than 1,000 g); in other embodiments, the size of the modular connectors is 15-30 cm×15-30 cm×15-30 cm and the weight of the modular connectors is between 1000-5000 g, but can be any size.

In one or more embodiments, a modular connector may include a variety of components, including but not limited to: a face panel and four side panels that function as a casing for the modular connector; a claw assembly to facilitate a physical connection to an adjacent modular connector; a swivel arm assembly to facilitate motion of the claw assembly; a gear mount; a planetary gear assembly; a motor; a transfer disc to facilitate motion of the swivel arm assembly; a claw assembly; a track to provide stability for the multitude of components; a main electronics circuit board to provide power and facilitate control of the modular connector; and multiple interface boards mounted to the face panel to provide a power/data interface between two modular connectors. The modular connector can include one or more distance/range sensors and power regulation circuitry. In various embodiments, the interface boards may include pogo pins, or any other suitable electrical connectors, to facilitate the connection of both male and female components. The pins can be spring-loaded pins that provide electrical connectivity during movement of the pins.

In various embodiments, two or more modular connectors may communicate with each other and exchange data wirelessly prior to establishing a physical connection. In one embodiment, the two or more modular connectors may communicate with each other via radio frequency. In another embodiment, the two or more modular connectors may communicate with each other via optical communications. In particular embodiments, to facilitate docking, two or more modular connectors may exchange attitude information with each other prior to establishing a physical connection.

In one or more embodiments, a modular connector may mate, or pair with another modular connector. In these embodiments, due to the androgynous nature of the modular connectors, prior to connecting, the pairing modular connectors determine which device will function as a male and which device will serve as the female. This on-the-fly determination of gender roles, in combination with the modular connector's small size, multiple docking orientations, and soft and hard capture capability (as will be discussed herein), establish a notable improvement over previous technology, which was more limited and less efficient.

Alternative embodiments of modular connectors may include features that are, in some respects, similar to the various components described above. For example, such alternative embodiments may include, but are not limited to: larger dimensions, different connection claws, various data and power mechanisms, and other like variations.

Exemplary Embodiments

Figure 1B:
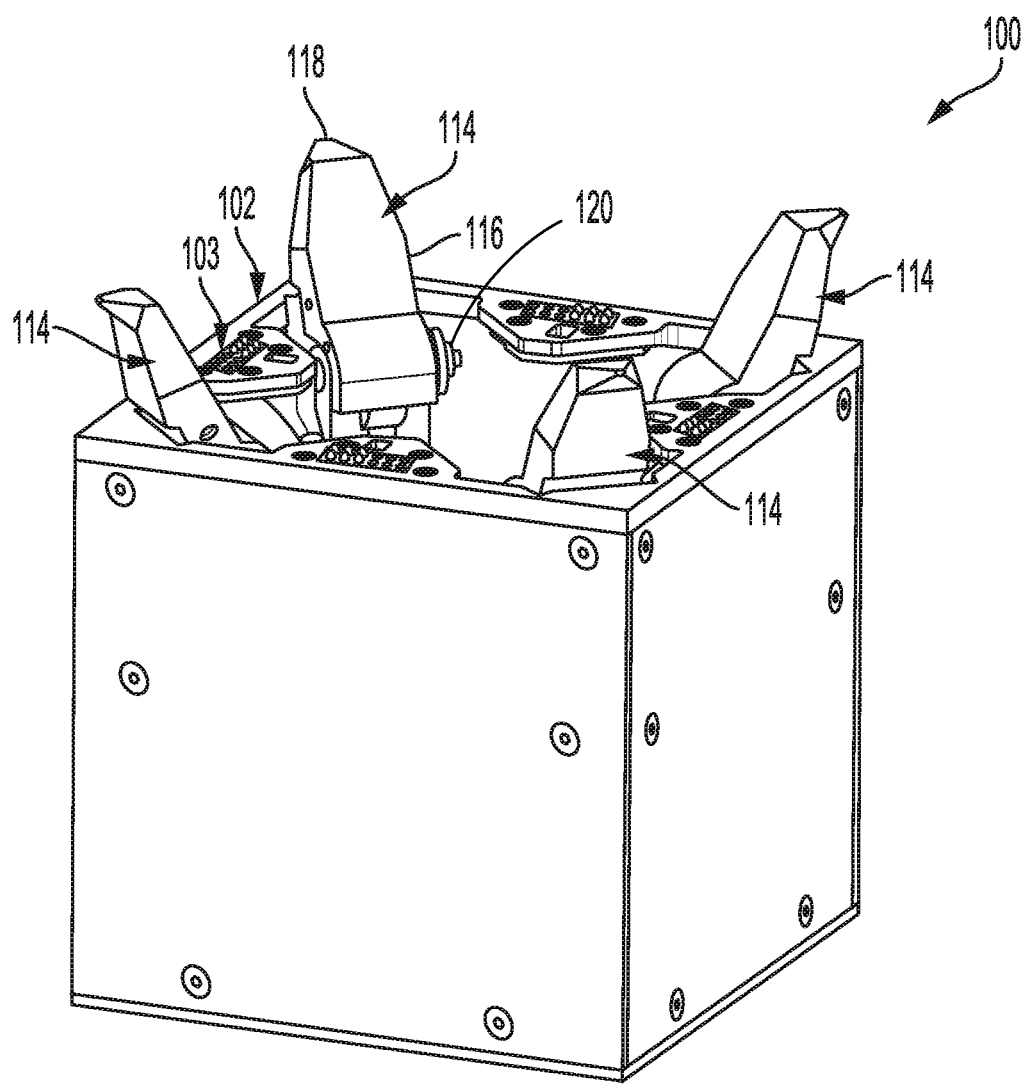
FIG. 1B illustrates an exemplary modular connector according to one embodiment of the present disclosure.

Turning now to FIGS. 1A and 1B, perspective views of an exemplary modular connector 100 are shown, according to one embodiment of the present disclosure. In particular embodiments, the exemplary modular connector 100 is configured to be positioned on or connected to a modular device, such as a satellite module or a robotic modular. Multiple modular connectors 100 can be respectively positioned on or connected to multiple modular devices. In some embodiments, two or more modular connectors 100 can be mounted to a single modular device, such that the modular device can couple to two or more other modular devices. In some embodiments, the modular devices can be used for integration with one or more satellite platforms. As used herein, a satellite module refers to a payload (e.g., electronic product, space probe, mechanical tool, etc.) placed into orbit, and a satellite platform refers to a collection of two or more satellite modules. Although some aspects of the present disclosure are discussed with reference to spacecraft or satellites, nothing in the disclosure limits such aspects to use with spacecraft or satellites. In some embodiments, the exemplary modular connector is a modular spacecraft connector, such that the modular connector provides mechanical, power, and data connection between satellite modules. In one or more embodiments, data may be transferred wirelessly (e.g., radio frequency, optical communications, etc.) and/or wired (e.g., Ethernet). In some embodiments, the data may be transferred wirelessly between two or more modular connector when a wired connection is not present or not working, and through the wired connect when the wired connection is present. In some embodiments, an interface can be provided to transfer fluids between the modular connectors. As an example, a liquid propellant can be transferred from one modular connectors to another. In some embodiments, the interfaces extend through to the modular device, such that power transfer, data transfer, fluid transfer, and mechanical transfer can occur between modular devices via the modular connectors, or between a modular device and a paired modular connector. The fluid interface can include a sealing mechanism to prevent leaking. As an example, when the fluid interface from two modular connectors come into contact, a clamping mechanism can compress the interface together to prevent leaking. In another example, the pulling force of the claw assembly 114 can provide a clamping force on the fluid interface to provide a seal.

For example, a satellite module containing one modular connector may establish a connection to a second satellite module containing a second modular connector. In this example, once connected, both satellite modules are now operative to share data and power such that the satellite modules collectively form a satellite platform. Continuing with this example, and as will be further discussed herein, to establish a connection, the modular connectors interlock their respective components and interface with each other. In various embodiments, the connection of multiple satellite modules via one or more modular connectors allows for an embedded redundancy. In these embodiments (and others), data and power may not be lost in the event of a failure by one or more system components.

According to various aspects of the present disclosure, and as shown in FIG. 1A, the exemplary modular connector 100 includes a face panel 102 affixed to four side panels 104. The face panel can include several interfaces 103 as described herein. In one or more embodiments, the face panel may be a generally four-sided figure, whereby the four sides define an opening. In at least one embodiment, the face panel 102 is generally square-shaped. In another embodiment, the face panel may be any suitable shape (e.g., triangular, hexagonal, circular, etc.). In some embodiments, a number of extendable arms can correspond to a number of sides in the shape of the face panel. In some embodiments, one or more corners of the face panel 102 include a substantially triangular tooth 108 extending below the surface of the face panel to provide support when the modular connector 100 is paired with another modular connector. In various embodiments, the substantially triangular tooth allows for a corner notch 112 in the opening defined by the face panel 102. In at least one embodiment, the tip 110 of the tooth 108 is angled inward towards the inner walls of the side panels 104 to further facilitate the pairing of modular connectors. In some embodiments, each of the four side panels 104 is substantially square-shaped. In particular embodiments, the side panels 104 and the face panel 102 connect to form a prismatic-shaped modular connector. In various embodiments, the modular connector may be any suitable shape.

In certain embodiments, one or more interfaces can be coupled to the face panel 102. The interfaces can include interface boards 106. In these embodiments (and others), the interface boards may extend from one or more sides of the face panel into the opening defined by the face panel 102. In one embodiment, the interface boards 106 are semi-octagonal in shape. In another embodiment, the interface boards 106 are semi-circular in shape. In various embodiments, the interface boards may be any suitable shape (e.g., triangular, rectangular, etc.). In at least one embodiment, the one or more interface boards 106 facilitate an electronic connection when the modular connector 100 is paired (e.g., connected) to another modular connector. In certain embodiments, the interface boards allow for the transfer of power and data between connected modular connectors. In one or more embodiments, data may be transferred wirelessly (e.g., radio frequency, optical communications, etc.) or wired (e.g., Ethernet). In particular embodiments, the interface boards help to regulate power in the modular connector 100. In one or more embodiments, the interface boards help to regulate power received by, and transferred to, a connected (e.g., paired) modular connector. In at least one embodiment, a modular connector 100 may draw extra power from a connected satellite platform. In some embodiments, the interface boards 106 may provide a gateway to one or more ground stations to facilitate communication. In various embodiments, the one or more interface boards 106 include proximity sensors to help detect the presence of nearby objects (e.g., modular connectors, satellites, etc.). In various embodiments, the interface boards may include pogo pins, or any other suitable electrical connectors, to facilitate the connection of both male and female components. A pogo pin can include a spring-loaded pin that provides electrical connectivity from various positions of the spring. The pogo pins can counteract unwanted movement which might cause intermittent connections.

In the embodiment shown in FIG. 1B, four connection arms (e.g., claw assemblies) 114 can be seen extending upward and out from the corners of the face panel of the exemplary modular connector 100. Various mechanical components inside of the modular connector can facilitate the extension of the connection arms 114, which are further discussed below with reference to FIG. 2. In certain embodiments, the exemplary modular connector may include any number of connection arms 114 necessary to facilitate the functionality described herein (e.g., two, five, eight, etc.). The connection arm 114 can also be referred to as a connection claw. In particular embodiments, a connection arm 114 may include a substantially rectangular prism-shaped body 116 with a substantially triangular prism-shaped tip 118 at the top. In particular embodiments, the connection arm 114 may include one or more rotatable joints 120 whereby the body 116 and/or tip 118 of the connection claw can rotate forward or backward. In certain embodiments, the body of the connection claw may be in any suitable shape (e.g., prismatic including cylindrical, cuboidal, etc. or some other shape) In one embodiment, the tip 118 of the connection arm 114 extends outward at a more acute angle than the body 116 relative to the face panel 102. In various embodiments, the tip 118 and the body 116 of the connection arm 114 may extend at any suitable angle to achieve the functionality described herein.

Figure 2:
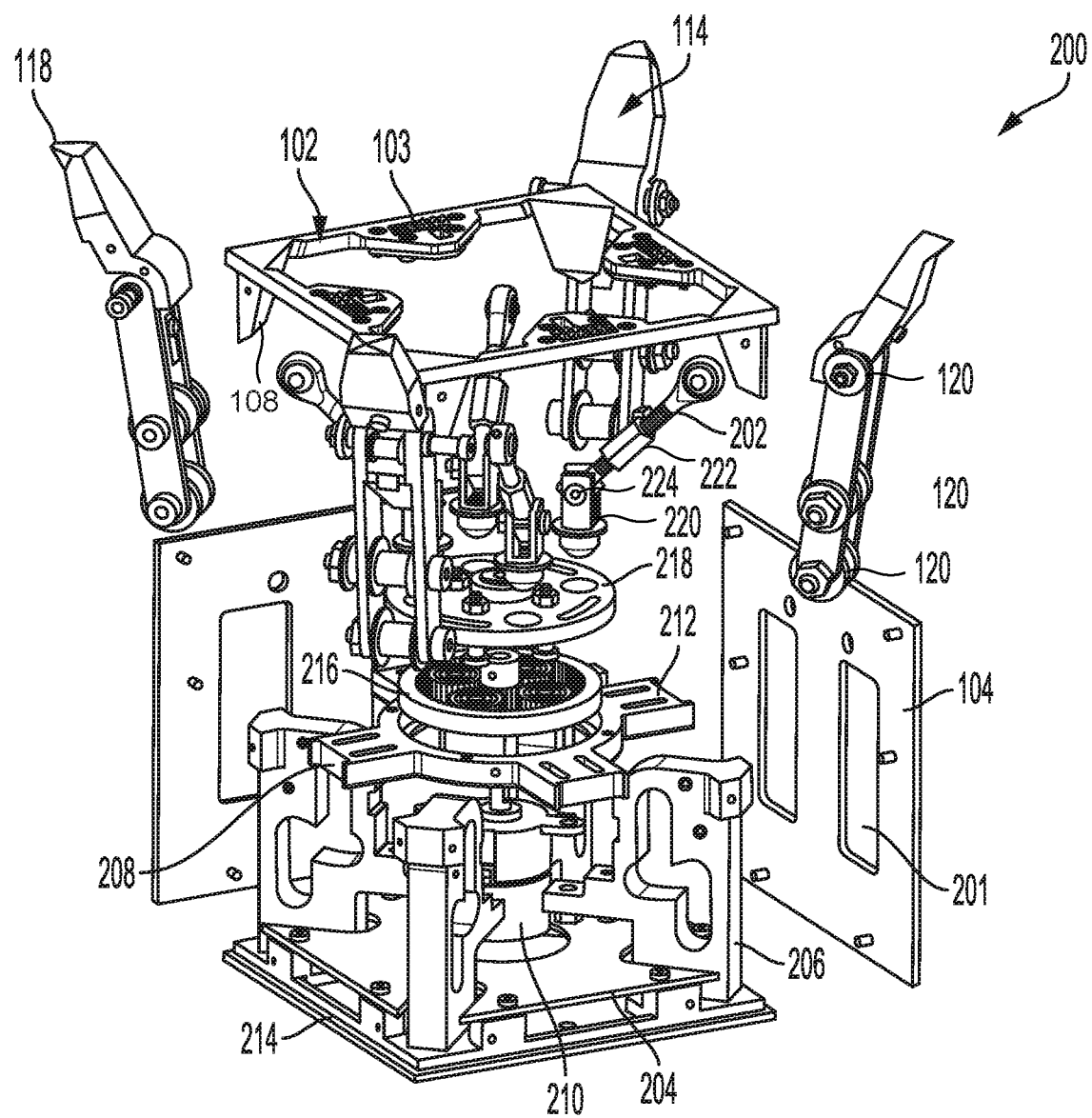
FIG. 2 illustrates an exploded view of an exemplary modular connector according to one embodiment of the present disclosure.

Turning now to FIG. 2, an exploded and disassembled view of an exemplary modular connector 100 is shown, according to one embodiment of the present disclosure, illustrating the various aspects of the modular connector. In one embodiment, a modular connector may include a face panel 102 and four side panels 104 that function as a casing for the modular connector 100. In certain embodiments, and as shown in FIG. 2, the side panels 104 may include one or more windows 201. In other embodiments, the one or more windows 201 may be omitted. In another embodiment, a modular connector may include a claw assembly (e.g., connection arms) 114 to facilitate a physical connection to an adjacent modular connector. In particular embodiments, a modular connector includes a swivel arm assembly 202 to facilitate motion of the claw assembly. In these embodiments (and others), the swivel arm assembly 202 includes a substantially vertical base 220 connected to an arm extension 222 by a rotatable joint 224. In some embodiments, the arm extension 222 connects to the claw assembly 114 to facilitate extension of the claw assembly.

In certain embodiments, a modular connector 100 includes a planetary gear assembly 216 to facilitate motion of the swivel arm assembly 202 (and connection arm 114). In various embodiments, a modular connector may include a gear mount 212 to provide structural support for the planetary gear assembly. In some embodiments, the planetary gear assembly 216 includes one or more notched circular gears that are interconnected with each other and connected to a motor 210. In particular embodiments, the motor provides torque to turn the planetary gear assembly 216 and engage a transfer disc 218. In at least one embodiment, the transfer disc helps convert the torque from the motor 210 into a substantially linear force to help move the swivel arm assembly 202, and ultimately, the claw assembly 114. In one embodiment, the transfer disc is substantially circular in shape. In another embodiment, the transfer disc 218 may be any suitable shape to perform the functionality described herein. In various embodiments, a modular connector 100 may include a track 206 to provide stability for the multitude of components. In these embodiments (and others), the track is connected to a base 214, whereby the base is the bottom surface of the modular connector 100. The modular connector 100 can be connected to a modular device, such as a spacecraft, at an exterior of the base, among other potential coupling positions. In at least one embodiment, the base 214 provides stability and support for a modular connector 100. In one embodiment, the base is substantially square-shaped. In another embodiment, the base 214 is substantially the same shape as the face panel 102. In some embodiments, the base may be any suitable shape to facilitate the functionality described herein.

In various embodiments, an exemplary modular connector 100 includes a main electronics circuit board 204 to provide power and facilitate control of the modular connector. In certain embodiments, the main electronics circuit board 204 provides connection support for a variety of components, including but not limited to: limit switches, proximity sensors, digital controllers, inertial measurement units, power connection sensors, and other suitable components. In some embodiments, the inertial measurement unit (IMU) can be a multi-axis IMU, such as, for example, a nine-axis IMU. In some embodiments, the main electronics circuit board manages data acquisition. In certain embodiments, the main electronics circuit board 204 communicates with the interface boards described above and controls the motor 210. In one embodiment, the main electronics circuit board may include four protruding sections, whereby the center of the main electronics board has a substantially circular aperture and the ends of each protruding section are shaped like a portion of a triangle. In another embodiment, the main electronics 204 circuit board may be any suitable shape to perform the functionality described herein.

The motor 210 can be housed substantially within a body of the modular connector. When connecting to another modular connector as the male-selected modular connector, the motor can extend the claw assembly 114 first through an opening in a face plate of the male-selected modular connector and then similarly through an opening in the face plate of the female-selected modular connector. In some embodiments, the faceplate can include a cutout in the shape of an "X" to mechanically force the modular connector into axial alignment as the claw assembly 114 begin to latch. Other configurations of cutouts can also be included to force axial alignment. The claw assembly 114 of the female-selected modular connector can retract to provide room for the extending claw assembly 114 of the male-selected modular connector. The extending claw assembly 114 can latch within the body of the female-selected modular connector. The extending claw assembly 114 can retract to connect with the triangular tooth (or corner grip) 108 of the female-selected modular connector to provide structural support as is described herein. Upon retracting, the claw assembly can establish one or more interface connections between the male-selected modular connector and the female-selected modular connector. The interfaces can include electrical transfer, mechanical transfer, fluid transfer, and data transfer, among others. Before extending the claw assembly, the male and female-selected modular connectors can communicate wirelessly to establish a rendezvous routine. The modular connectors can, each together or a selected one, perform the automated rendezvous routine to become proximate to one another such that the extending claw assembly 114 is aligned with the opening in the faceplate of the female-selected modular connector.

Once connected, the male and female-selected modular connectors can disconnect and reconnect with other or the same modular connectors as desired. To disconnect, the male-selected modular connector can detach the interfaces and extend the claw assembly. The claw assembly 114 can be retracted from the body of the female-selected modular connector. Once disconnected, a new automated rendezvous routine can be determined for each modular connector. The gender for future connections by the male and female-selected modular connectors may or may not be based on the previous gender selections. Upon performing a new rendezvous routine, the modular connectors can connect with and disconnect with other modular connectors as desired and as described herein.

Figure 3B:
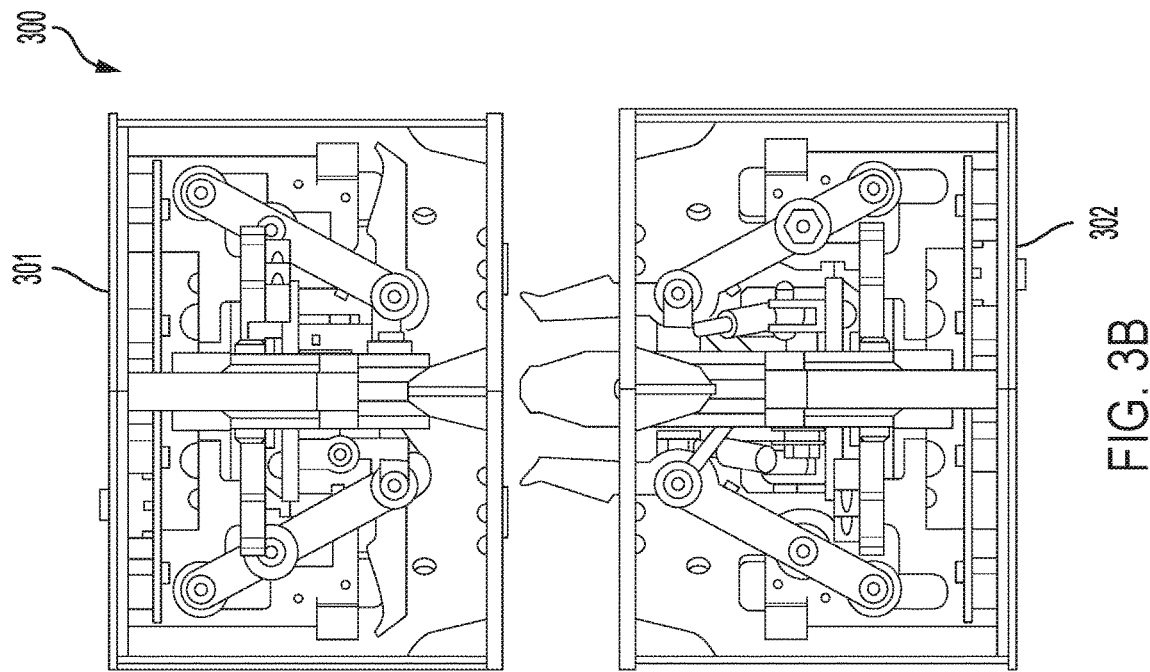
FIGS. 3A-3F illustrate an exemplary modular connector pairing sequence according to one embodiment of the present disclosure.
Figure 3A:
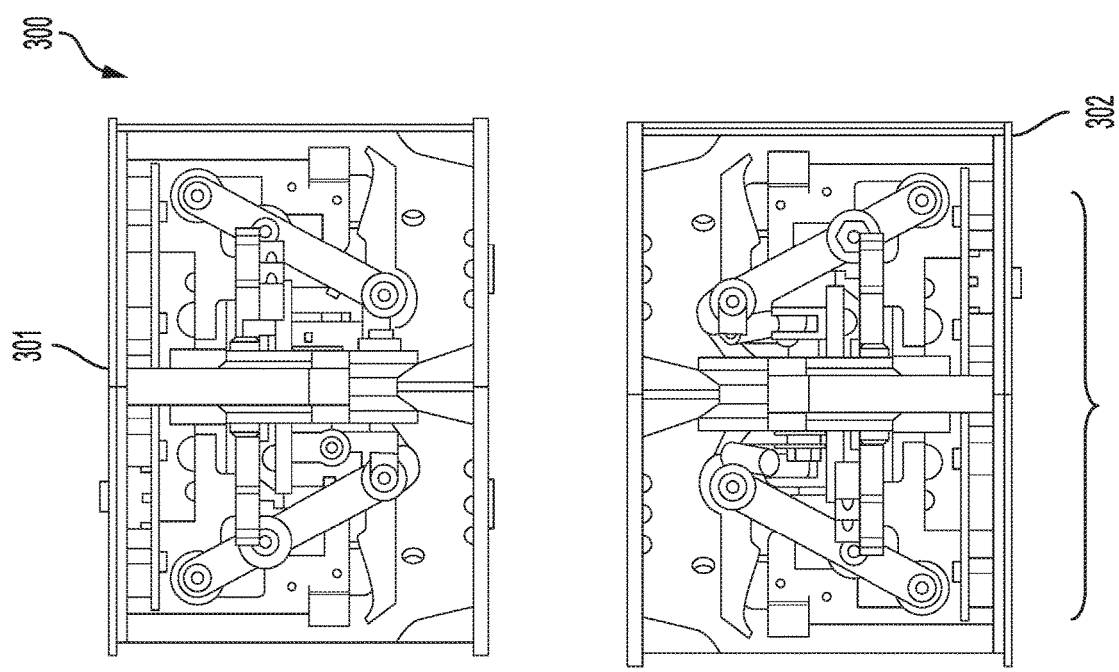

Now referring to FIGS. 3A-3F an exemplary modular connector pairing sequence 300 is shown, according to one embodiment of the present disclosure. In one or more embodiments, the pairing process may begin when two devices (e.g., modular connectors 301 and 302) initiate a rendezvous routine. The two devices can communicate via a wireless communication means to exchange data used to determine the rendezvous routine. The data can include a current location and orientation of each device. As used herein, a rendezvous or rendezvous routine is a series of maneuvers designed to bring a spacecraft from orbital insertion to the near-proximity of another spacecraft already in orbit, as shown in FIG. 3A.

A computing device on the electronics board can be used to identify a desired meeting point in space for the rendezvous and compute the series of maneuvers to bring the modular device to the near-proximity of another modular already in orbit. The computing device can determine the series of maneuvers in order to minimize energy necessary for the rendezvous. The computing device can access data describing an estimated electrical energy necessary to perform each of the maneuvers that the modular connector is capable of performing. The estimated electrical energy may be based on capabilities, size, and weight of a modular device (or series of modular devices and modular connectors) coupled to each modular connector involved in the rendezvous. The computing device can cause the modular connector and/or modular device to perform the series of maneuvers. While performing the maneuvers, the computing device can continually update the series of maneuvers based on sensor measurements during the rendezvous. The computing devices on the pairing two or more modular connectors can communicate wirelessly to determine and continually update the maneuvers until rendezvous is complete.

In at least one embodiment, the modular connectors may share and collect attitude information prior to docking. In these embodiments (and others), infrared LEDs may be used to facilitate collection of attitude information. In particular embodiments, upon rendezvousing, the pairing modular connectors 301 and 302 initiate docking. In these embodiments, due to the androgynous nature of the modular connectors, during the docking initiation, the pairing modular connectors determine which device will function as a male and which device will serve as the female. This on-the-fly determination of connector gender roles, in combination with the modular connector's small size, multiple docking orientations (e.g., modular connectors may accept docking in two rotational orientations 180 degrees apart, or four rotational orientations 90 degrees apart), and soft and hard capture capability (as will be discussed herein), establish a notable improvement over previous technology, which was more limited and less efficient. In one embodiment, the connector gender roles can be determined based on the current operational status of both connecting devices. As an example, if a connection arm 114 on one of the devices is inoperable, the other device can function as the male-selected modular connector 302. The gender of the connectors can also be selected based on random selection, a status of existing gender connections for a set of modular connectors, based on capabilities of each modular connector, or through some other means. As an example, a first modular connector may be selected as a male connector if a second modular connector corresponds to a different revision for the modular connector that lacks a desired capability of the connection arm of the first modular connector.

Figure 3D:
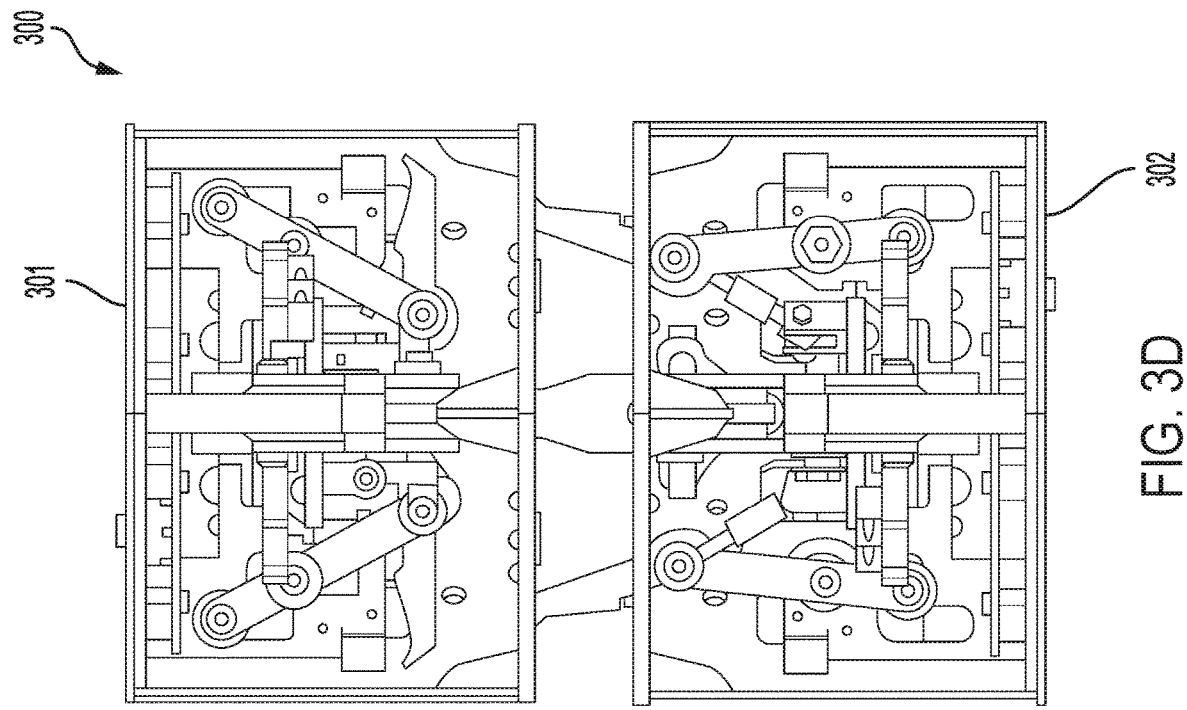
Figure 3C:
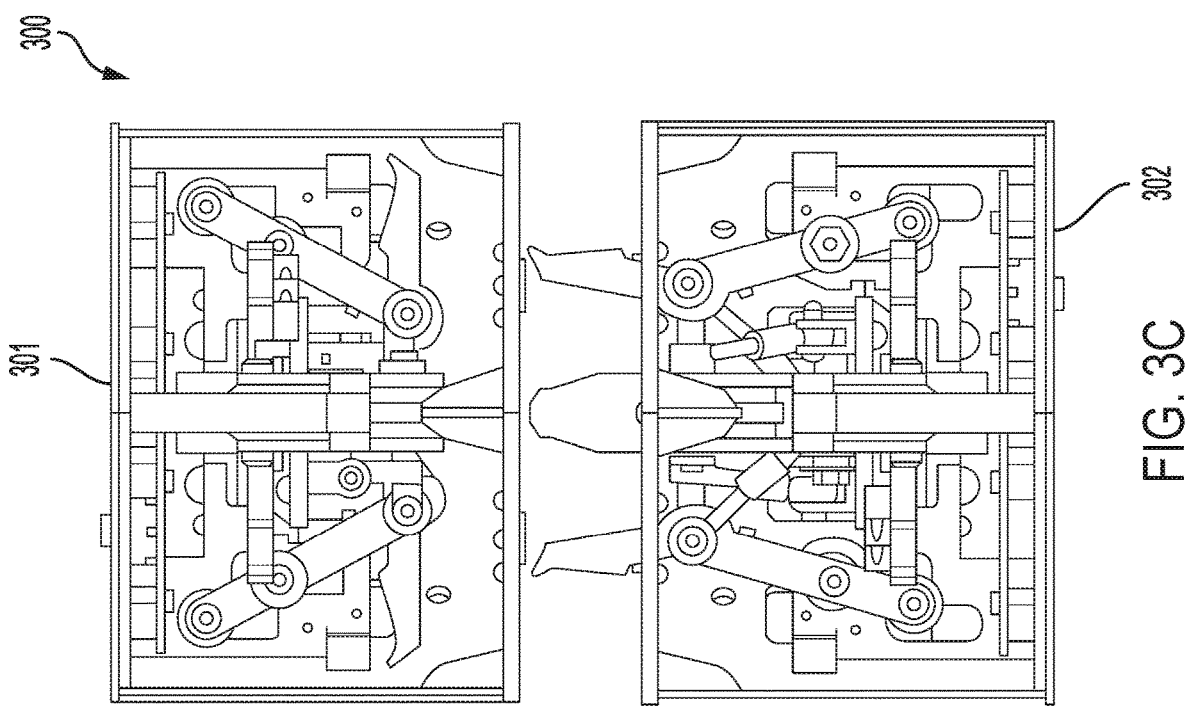

In various embodiments, the pairing process continues with the two modular connectors 301 and 302 completing a soft capture, where the claw assembly of the male-selected modular connector 302 is securely attached to the face panel of the female-selected modular connector 301. The claw assembly includes four arms that each correlate to a corner of the modular connector. In one or more embodiments, the claw assembly extends outward from the face panel of the male-selected modular connector. In these embodiments, and as shown in FIG. 3B, the claw assembly begins its extension with each of the four arms substantially positioned towards the center of the face panel in a position where the four arms are proximate to one another. In various embodiments, and as shown in FIG. 3C, as the claw assembly further extends out from the male-selected modular connector 302 and into the female-selected modular connector 301, the arms of the claw assembly extend from the center and towards the corners of the female-selected modular connector 301. In particular embodiments, and as shown in FIG. 3D, the claw assembly then latches onto the corners of the face panel of the female-selected modular connector 301.

Figure 3F:
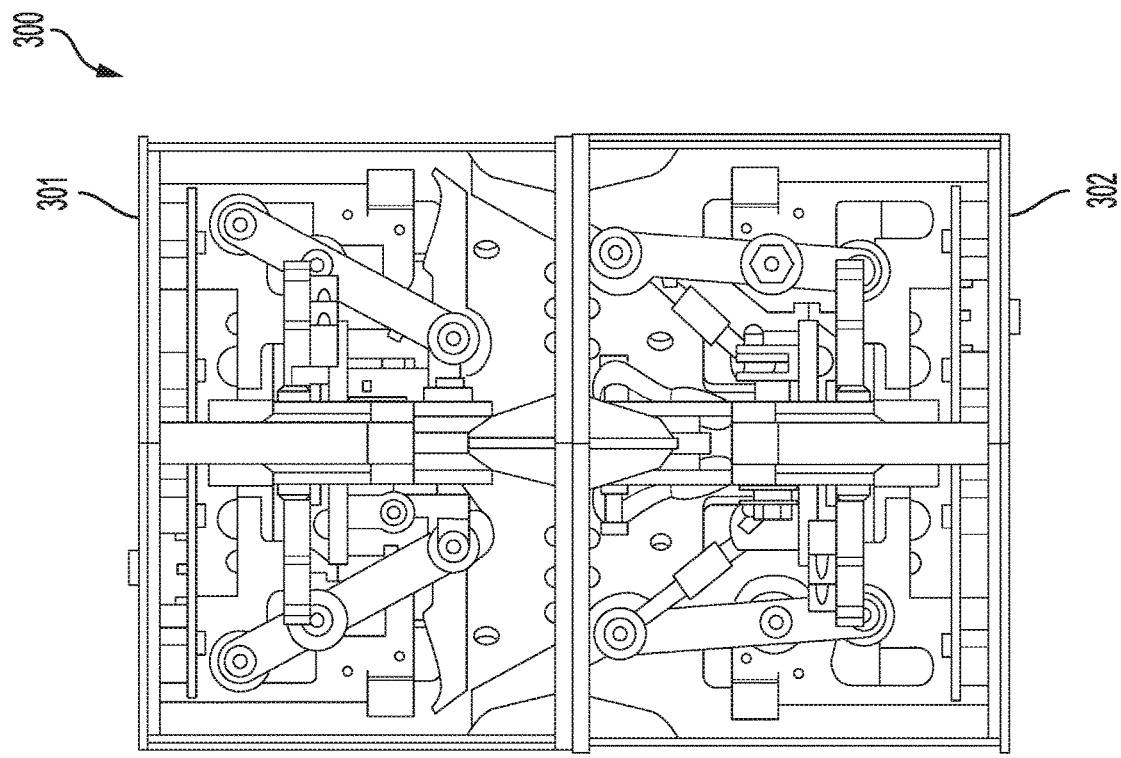
Figure 3E:
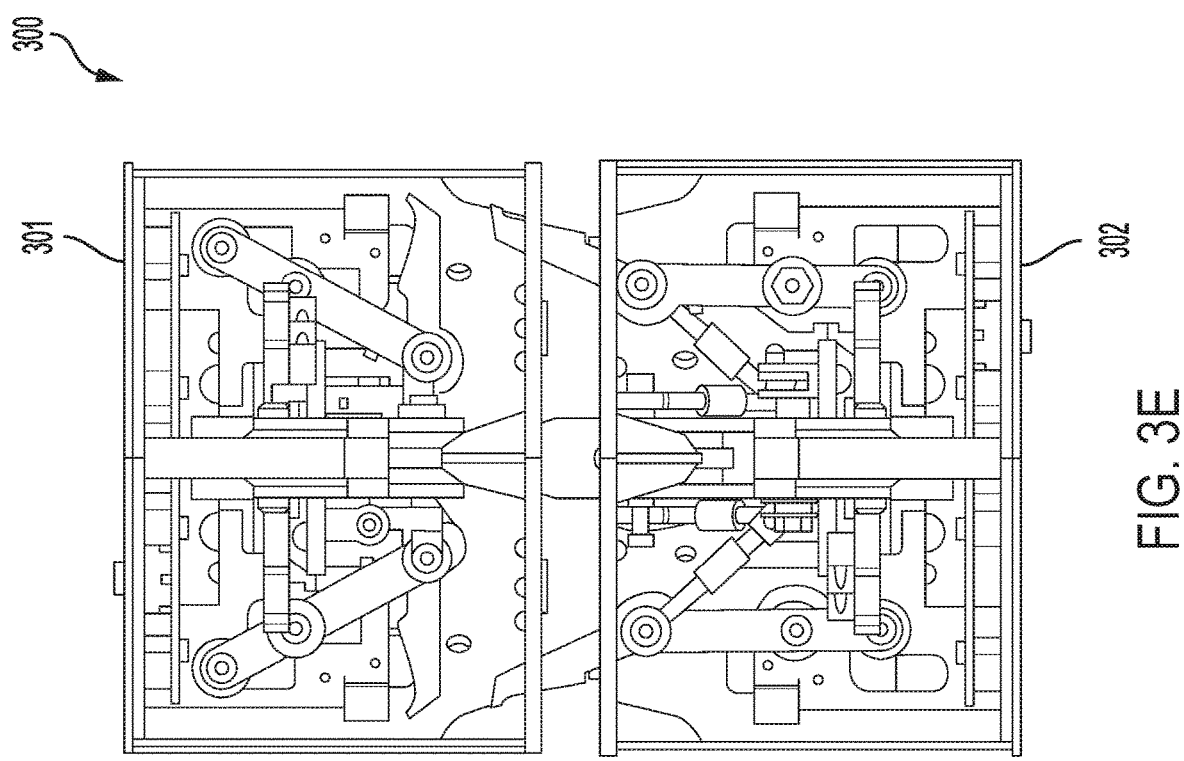

Next, in certain embodiments, and as shown in FIG. 3E, the modular connectors pull each other towards one another via a motor or other force generating device. In at least one embodiment, upon latching onto the corners of the female selected modular connector 301, the connection arms of the male selected modular connector 302 pulls the female selected modular connector 301 towards itself. The face panel of the female modular connector 301 can include a contoured surface or corner grip for the tip of the connection arms of the male selected modular connector 302 to fit within. The corner grip can inversely mirror a contour of an outside of the tip of the connection arm. The corner grip can be angular to provide support for both forces in a direction perpendicular to the face panel and parallel to the face panel. The angular nature of the corner grips can force the modular connectors to be forced together when the connection arm pushes outwards. As an example, when each of the connection arms of the male selected modular connector 302 contact a corresponding contoured surface of the face panel for the female selected modular connector 302, the connection arms can pull against the contoured surface to provide structural support. The structural support can include support for pulling or outward forces and shearing forces. The connection arms are also constrained to a specific motion based on the tracking formed in part by the corner grips.

In the event that two modular connectors are not properly aligned, in various embodiments, the proximity sensors and inertial measurement units on the modular connectors can facilitate realignment of the modular connectors without the need for human input. In particular embodiments, the pairing process ends upon completion of a hard capture. In these embodiments, a hard capture is completed upon establishing a surface connection as shown in FIG. 3F, such that data and power may be transferred between the male selected modular connector 302 and female selected modular connector 301. In one or more embodiments, the pairing process is sensor-controlled and may take less than five seconds to complete.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing the steps disclosed herein. The particular sequence of such executable instructions or associated data structures represent examples of corresponding acts for implementing the functions described in such steps.

Those skilled in the art will also appreciate that the claimed and/or described systems may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A modular connector comprising:
a prismatic-shaped body comprising side panels, a base, and a face panel, wherein the base comprises a bottom surface of the prismatic-shaped body, the side panels comprise sides of the prismatic-shaped body, and the face panel comprises a top surface of the prismatic-shaped body, wherein the face panel further comprises three or more sides that define an opening in the face panel;
a claw assembly housed substantially within the prismatic-shaped body, the claw assembly comprising two or more extendable arms, wherein each extendable arm comprises a respective body and a respective tip and the respective tip of each extendable arm extends outward at an angle more acute than an angle of the body relative to the face panel when each extendable arm is fully extended; and
a motor operatively connected to the claw assembly, wherein the motor is configured to extend and retract the claw assembly.

2. The modular connector of claim 1, wherein the claw assembly is configured to dock to a second modular connector in a plurality of orientations.

3. The modular connector of claim 1, further comprising a multi-axis inertial measurement unit in communication with a digital controller, the digital controller configured to determine an orientation of the modular connector based on at least one measurement from the inertial measurement unit.

4. The modular connector of claim 1, wherein the modular connector is designed to operate in one of: geostationary planetary orbit and low planetary orbit.

5. The modular connector of claim 1, further comprising a main electronics board for operational control of the modular connector.

6. The modular connector of claim 5, further comprising one or more electronic interface boards for transferring and receiving data, the one or more electronic interface boards comprising proximity sensors.

7. The modular connector of claim 1, further comprising one or more interfaces comprising at least one of: a load-bearing mechanical interface, a power transfer interface, a fluid transfer interface, a mechanical transfer interface, and a two-way data transfer interface.

8. The modular connector of claim 1, wherein the modular connector weighs no more than 900 g, a length of the modular connector does not exceed 10 cm, a width of the modular connector does not exceed 10 cm, and a height of the modular connector does not exceed 10 cm.

9. A system for connecting two or more modular devices comprising:
a first modular connector; and
a second modular connector, wherein each of the first and second modular connectors comprise:
a prismatic-shaped body comprising side panels, a base and a face panel, the base being coupled to a respective one of the two or more modular devices;
one or more interfaces configured to transmit and receive data;
a claw assembly housed substantially within the prismatic-shaped body, the claw assembly comprising two or more extendable arms, wherein each extendable arm of the two or more extendable arms comprises a respective body and a respective tip and the respective tip of each extendable arm extends outward at an angle more acute than an angle of the body relative to the face panel when each extendable arm is fully extended; and
a motor operatively connected to the claw assembly, wherein the motor is configured to extend and retract the claw assembly;
wherein the claw assembly of the first modular connector is configured to:

extend, enter, and latch onto the prismatic-shaped body of the second modular connector via openings in the face panels; and upon latching onto the prismatic-shaped body of the second modular connector, retract until the one or more interfaces of the first modular connector is operatively connected to the one or more interfaces of the second modular connector.

10. The system of claim 9, wherein the base comprises a bottom surface of the prismatic-shaped body, the side panels comprise sides of the prismatic-shaped body, and the face panel comprises a top surface of the prismatic-shaped body and three or more sides that define the opening in the face panel, and wherein the face panel further comprises the one or more interfaces.

11. The system of claim 9, wherein the claw assembly of the second modular connector is configured to retract to provide room for the claw assembly of the first modular connector.

12. The system of claim 9, wherein the one or more interfaces of the first modular connector and the one or more interfaces of the second modular connector comprise androgynous connectors of the same type.

13. The system of claim 9, wherein the one or more interfaces comprises redundancy via bypass and pass-through connections for power and data.

14. The system of claim 9, wherein the two or more extendable arms each comprises a respective prism-shaped beak.

15. The system of claim 9, wherein the first and second modular connectors exchange data via at least one of: radio frequency communication, optical communication, infrared transceivers, and laser communication.

16. The system of claim 9, wherein the claw assembly is further configured to:

latch onto the prismatic-shaped body of the second modular connector by moving a respective tip of each of the extendable arms of the claw assembly of the first modular connector to contact a respective corner grip of the prismatic-shaped body of the second modular connector; and retract until the one or more interfaces of the first modular connector is operatively connected to the one or more interfaces of the second modular connector by applying, via the extendable arms, a pulling force on the corner grip of the prismatic-shaped body of the second modular connector.

17. The system of claim 9, wherein the first modular connector aligns in one of a plurality of docking orientations with the second modular connector prior to the first modular connector's claw assembly extending, entering and latching onto the prismatic-shaped body of the second modular connector.

18. The system of claim 17, wherein the first modular connector further comprises proximity sensors to align itself with the second modular connector.

19. A method for connecting two or more modular devices comprising:

extending, via a motor of a first modular connector, a claw assembly of the first modular connector through an opening in a prismatic-shaped body of a second modular connector, the claw assembly comprising two or more extendable arms, wherein each extendable arm of the two or more extendable arms comprises a respective body and a respective tip and the respective tip of each extendable arm extends outward at an angle more acute than an angle of the body relative to a face panel when each extendable arm is fully extended;

latching the claw assembly onto the prismatic-shaped body of the second modular connector via openings in face panels of the first modular connector and second modular connector; and upon latching onto the prismatic-shaped body of the second modular connector, retracting the claw assembly until one or more interfaces of the first modular connector couples to one or more interfaces of the second modular connector.

20. The method of claim 19, further comprising: prior to establishing an electrical connection via the one or more interfaces, exchanging, via a wireless connection, data between the first modular connector and the second modular connector.

21. The method of claim 19, further comprising: performing, via the first modular connector and the second modular connector, an automated rendezvous routine to cause the first modular connector and the second modular connector to be proximate to one another.

22. The method of claim 19, further comprising:

extending, via the motor housed of the first modular connector, the claw assembly of the first modular connector to disengage from the second modular connector; and retracting the claw assembly from the prismatic-shaped body of the second modular connector.

23. The method of claim 22, further comprising:

subsequent to retracting the claw assembly from the prismatic-shaped body of the second modular connector, extending the claw assembly of the first modular connector through an opening in a prismatic-shaped body of a third modular connector;

latching the claw assembly onto the prismatic-shaped body of the third modular connector via openings in the face panel of the first modular connector and a face panel of the third modular connector; and upon latching onto the prismatic-shaped body of the third modular connector, retracting the claw assembly until the one or more interfaces of the first modular connector couples to one or more interfaces of the third modular connector.

* * * * *